June 13, 1967 C. W. SCHILLING 3,324,601
AUTOMATIC CUT-OFF MACHINE
Filed Dec. 2, 1964 5 Sheets-Sheet 1

INVENTOR.
CLIFFORD W. SCHILLING
BY
ATTORNEY

June 13, 1967  C. W. SCHILLING  3,324,601
AUTOMATIC CUT-OFF MACHINE
Filed Dec. 2, 1964  5 Sheets-Sheet 4

INVENTOR.
CLIFFORD W. SCHILLING
BY
ATTORNEY 3,324,601
AUTOMATIC CUT-OFF MACHINE
Clifford W. Schilling, Urbana, Ill., assignor to P. R. Mallory & Co. Inc., Indianapolis, Ind., a corporation of Delaware
Filed Dec. 2, 1964, Ser. No. 415,398
13 Claims. (Cl. 51—108)

ABSTRACT OF THE DISCLOSURE

An apparatus having a cylindrical stock holder including a plurality of longitudinal grooves or slots for seating individual stock pieces. The stock holder rotates continually and a means advances the individual stock pieces so as to abut a stop means. After the individual stock piece abuts the stop means, a cam means releases a spring-loaded stock clamp against the stock piece so as to firmly retain the individual stock piece in a cutting position. A cut-off wheel is urged against the stock piece abrading a groove into the stock piece until it has been cut through thereby forming a work piece. As the stock holder continues to rotate, the work piece is dropped into a suitable receptacle and the next successive stock piece is displaced by the holder so that the cut-off wheel is urged thereagainst. Each individual stock piece is then unclamped, relocated against the stop and reclamped. A work piece is again cut therefrom. The holder retains a plurality of stock pieces, therefore, a plurality of work pieces are cut from the stock pieces during each cycle of operation.

---

This invention pertains to a machine which automatically cuts rod stock into selected lengths and continually compensates for the cut-off wheel wear, so that constant cutting speed results. Tungsten is one of the most difficult materials to cut and tungsten contacts are commonly produced by using an abrasive cut-off wheel to slice sections of desired thickness from tungsten rod. This may be done at a comparatively low rate by machines adopted to this purpose and at a much higher rate using the machine described in Patent No. 2,445,167 issued to Harry Dahl and Ernest W. Huebner. The present invention may be considered as much of an improvement over the Dahl-Huebner machine as the latter was over makeshift machines.

An object of this invention is to provide a machine that will cut off accurately, short or long sections of rod or tubing.

Another object of this invention is to provide a machine that will cut off a multiplicity of sections per cycle of operation.

Still another object of this invention is to maintain the lineal speed of the cut-off wheel at a substantially constant value despite erosion of the cutting surface and resultant decrease in diameter of the cut-off wheel.

Yet another object of this invention is to cut off refractory stock perpendicular to its longitudinal axis.

Another object of this invention is to clamp the stock firmly during the cutting operation, release it and relocate it against a preset stop and reclamp it for cutting without reducing the speed of operation.

A still further object of this invention is to accept full length stock and as short as one inch or mixed lengths.

Another object of this invention is to provide a plastic-coated cut-off wheel which decreases wear on adjacent guides.

Other, and incidental objects of this invention, will be apparent to those skilled in the art from a reading of the following specifications and an inspection of the accompanying drawings described herewith.

The principle of operation of this machine is based on the use of a cylindrical rod holder which rotates continually and pushes the rods against a settable stop to adjust the length of work piece. After the rod is seated aaginst the stop, a cam releases a spring-loaded stock clamp against the carrier, holding it tightly while the cut-off wheel is urged against the stock abrading a groove into the stock until it has been cut through. As the stock carrier continues to rotate, the cut-off rod drops into the container. The stock is then unclamped, relocated against the stop and clamped, and the end cut off again. As the carrier holds 24 rods, up to 24 work pieces may be cut off for each cycle of operation.

Figures 1, 2:
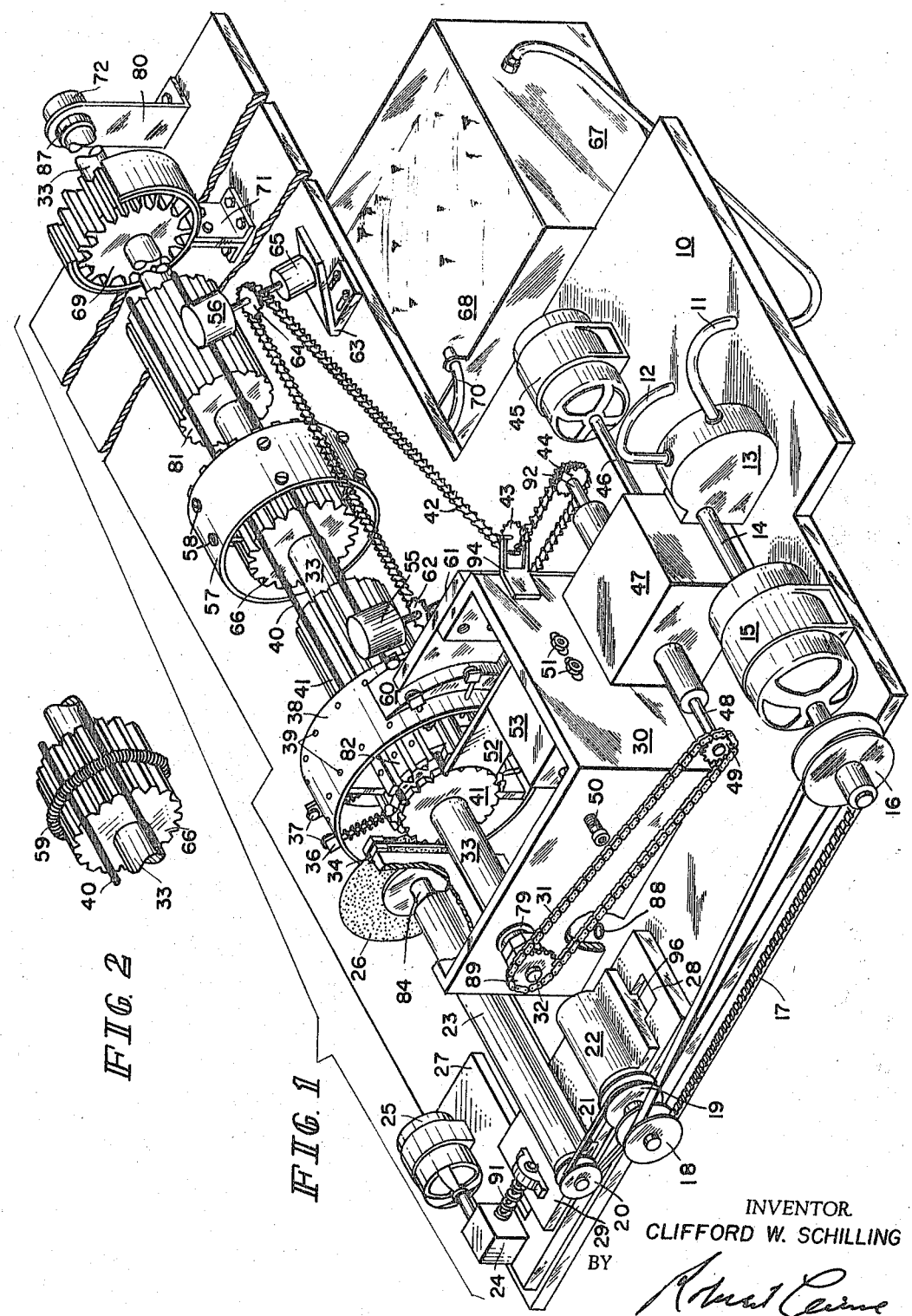
FIGURE 1 represents an isometric view of a preferred embodiment of this invention.
FIGURE 2 is an isometric view of an alternate construction of that section of the machine immediately adjacent.
Figures 4, 5:
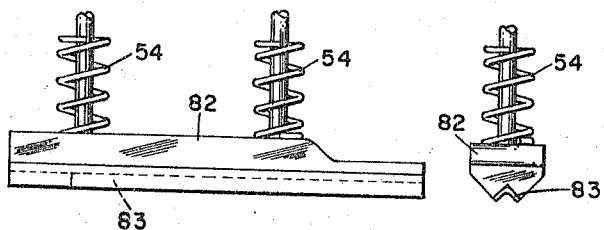
FIGURE 4 is a partial front view of a rod clamp assembly which forces the rod stock into the grooves of the stock carrier, and clamps it securely.
FIGURE 5 is a partial end view of the rod clamp assembly shown in FIGURE 4.

One embodiment of the machine comprising this invention is shown in FIGURE 1 and consists of a base 10 on which most of the parts constituting the assembly are mounted. At the near end of the base 10, the enclosure 30 is mounted so that shaft bearing 79 is in alignment with shaft bearing 87, and the drain fitting 88 is connected to the drain hose 70 which, in turn, is connected to the tank 67. The shaft 33 is shouldered 32 where it projects through the bearing 79 and a sprocket 89 is mounted on that end. The opposite end of the shaft 33 passes through a bearing 87 mounted in a bracket 80 and terminated by a collar 72, thus eliminating axial play.

Figure 6:
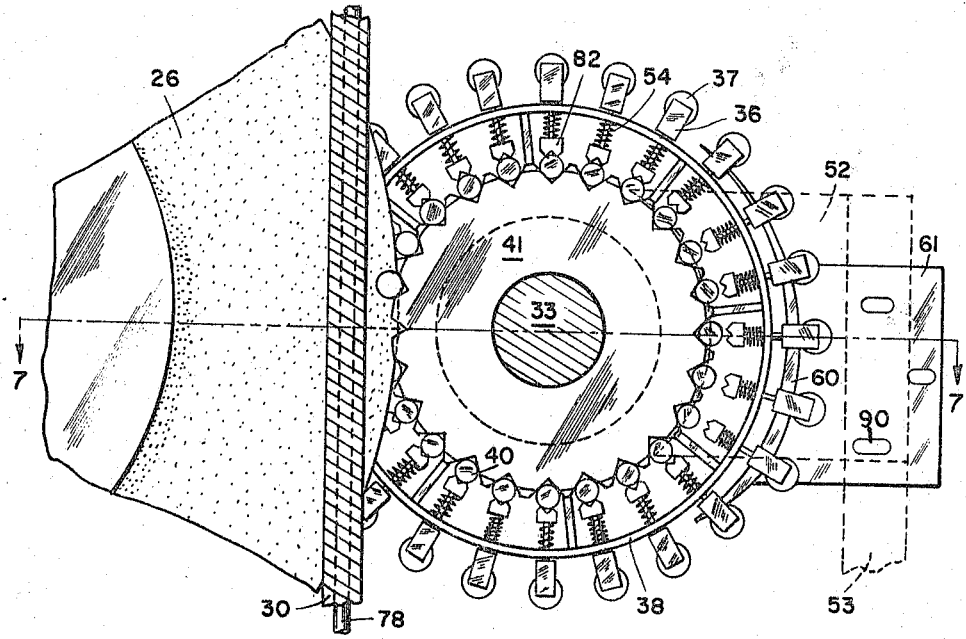
FIGURE 6 is an end view showing details of clamping and unclamping means as well as the cut-off wheel and guides.
Figure 7:
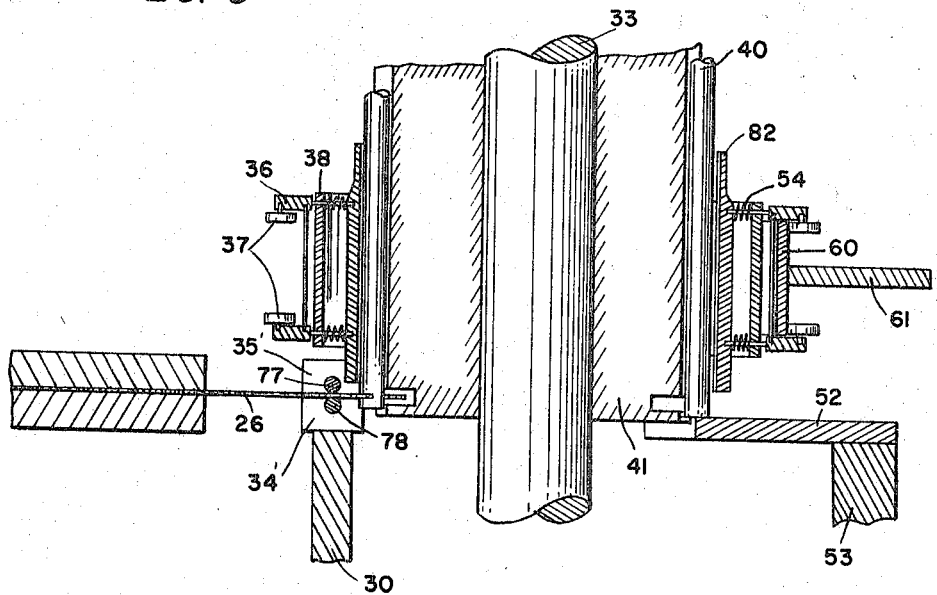
FIGURE 7 is a sectional view through section 7—7 of FIGURE 6.
Figure 8:
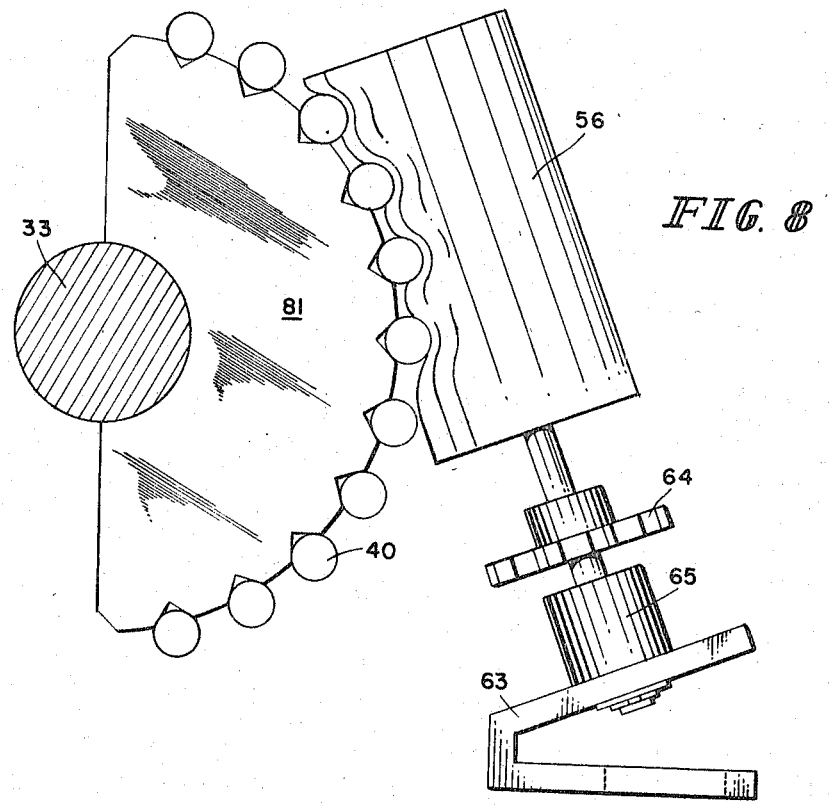
FIGURE 8 is a schematic representation of the construction and action of the feed rollers, and relationship to cooperating parts.

Starting at the sprocket 89 end of the main shaft 33, there are mounted two stock carriers 41 and 66, a stock guide 81 and a stock carrier 69, in that order. FIGURE 6 is an end view of the stock carrier 41 showing, in detail, the action of the stock release cam 60 and the action of the roller bracket 36, the roller 37, and the compression springs 54 as the stock carrier 41 is revolved with the main shaft 33. In order that the clamp ring 38 be concentrically located with respect to the stock carrier 41, slotted holes 90 are provided for such adjustment.

The enclosure 30 is shown partly cut away to clarify the manner of locating the cut-off wheel 26 and the guides 77 and 78. Likewise, the coolant nozzle 75, the coolant valve 76, and the supersonic transmitter tubing 73 and receiving tubing 74 are not shown in FIGURE 1 but are pictured schematically in FIGURE 3. Also, in the same figure is shown the locations of cut-off wheel guides 77 and 78 as well as cut-off wheel guide upper mountings 34 and 35 and lower mountings 34' and 35'.

Also, for the sake of clarity, only one stock clamp 82 is shown in FIGURE 1 as it is obvious where the balance of the clamps are assembled as they are fitted into the holes 39 of the clamp ring 38.

Figure 9:
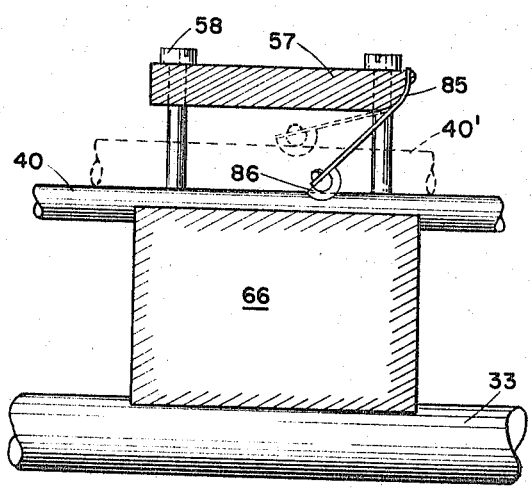
FIGURE 9 is a longitudinal cross section of the machine at the position directly opposite FIGURE 2.
Figure 10:
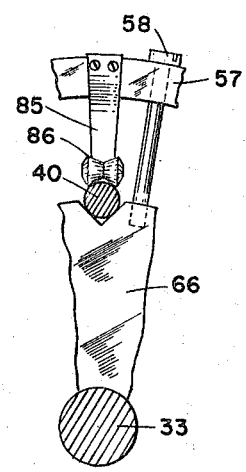
FIGURE 10 is an axial view of the structure shown in FIGURE 9.

The stock carrier 66, mounted adjacent, is secured to the stock supporting ring 57 by means of screws 58. In alignment with each V-groove of the stock carrier 66 is a leaf spring 85 attached to the stock supporting ring 57. The free end of each leaf spring is terminated in an hourglass-shaped spool 86 which presses the rod stock 40 into a cooperating groove. Details are clearly shown in FIGURES 9 and 10. As larger diameter stock 40' requires more force to hold it in place than does smaller diameter rods, this is automatically achieved by the ensuing increased deflection of the leaf spring 83.

Next, on the main shaft 33 is a stock guide 81 consisting basically of a rod with longitudinal V-shaped grooves on the surface. The grooves are of such a size that the smallest diameter stock will result in part of the stock protruding beyond the outer periphery of the stock guide 81. The rod stock is pushed axially by revolving elastomeric rollers 55 and 56 until the leading end of the stock butts against the stop arm 52. As the main shaft 33 rotates, the cam 60 releases the clamp 82 allowing the compression springs 54 to elongate, thus clamping the stock 40 to stock carrier 41. The clamping faces 83 of the stock clamp are lined with a plastic material to permit the use of high clamping forces without marring the stock 40 finish. As the stock guide 81 continues to rotate, the stock 40 is forced against the edge of the fast-rotating cut-off wheel 26 and is severed. As the main shaft 33 continues to rotate, the release cam 60 engages the stock clamps 82, compresses the springs 54 and releases the clamping action. As the plastic rollers 55 and 56 continue to turn, the stock 40 is forced against the stop arm 52 and the cycle is repeated until the stock 40 is exhausted.

The stock carrier 69 represents one of a series of such carriers which are spaced about one foot apart and serve not only to hold the stock 40 but the open top construction makes it easy to load stock into the machine while operating.

Figure 3:
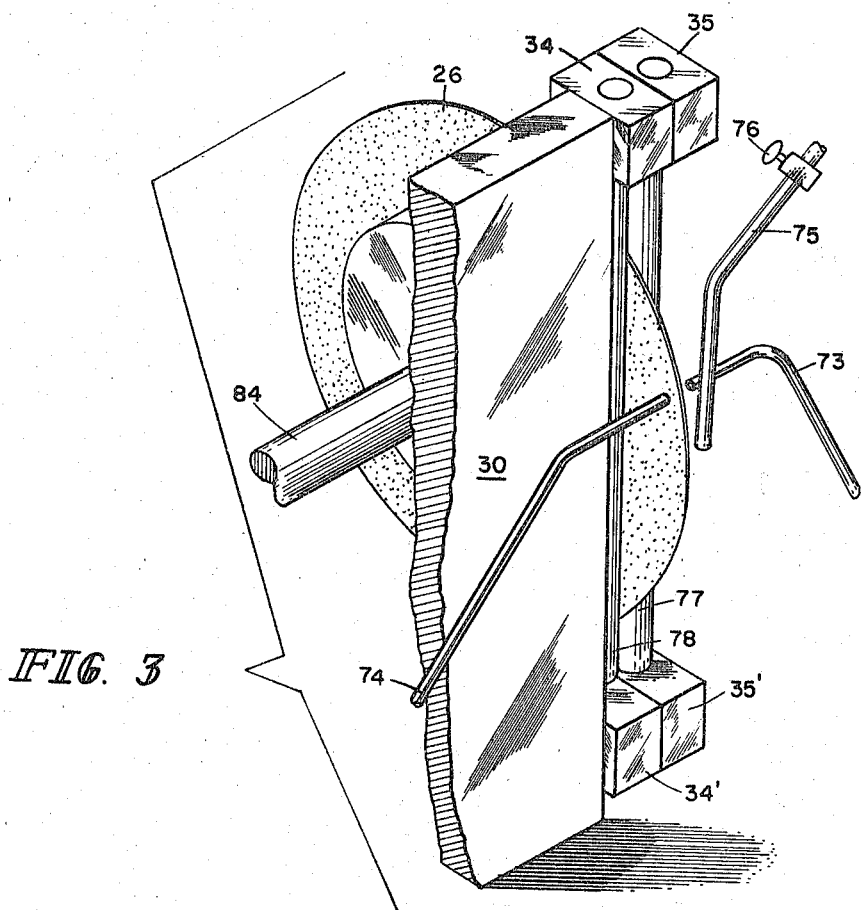
FIGURE 3 is a schematic representation of the relative positions of the cut-off wheel, guides, supersonic guide tubing and coolant nozzle with valve.
Figure 11:
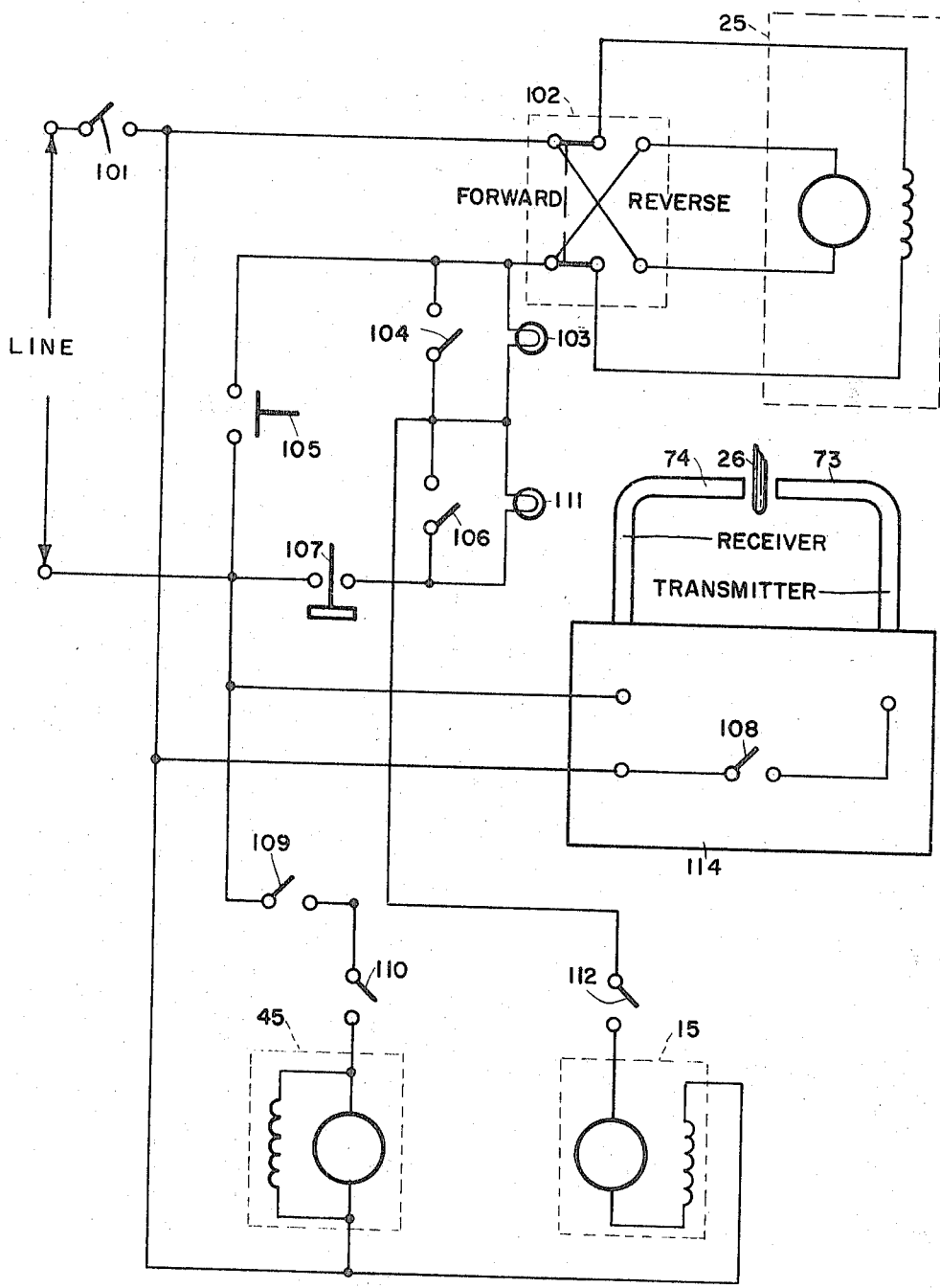
FIGURE 11 is a schematic wiring diagram of the circuitry embodied in this invention.

The machine automatically compensates for cut-off wheel wear which reduces the diameter of the cut-off wheel. This is accomplished by means of a supersonic transmitter and receiver 114 shown in FIGURES 3 and 11. FIGURE 3 shows a piece of tubing 73 connected to the output of the supersonic transmitter 114. This causes vibrations of the air column within the tube 73 at a specific frequency above audibility, such as 38,000 cps. The receiving tube 74 is aligned opposite the transmitting tube 73 and if no obstacle is interposed between the ends of the tubes 73 and 74, the sound energy in the transmitting tube 73 will bridge the gap between the tubes and the receiver will respond to the output of the transmitter by closing a relay 107. Closure of the relay 107 causes the motor 25 to operate which drives the gear reduction unit 24 providing a slow speed to operate the feed screw 91 connected to the sliding plate 29 so that the bearing 23 fastened to the sliding plate 29 is advanced towards the main shaft 33. This causes the outside edge of the cut-off wheel 26 to move between the tubes 73 and 74 and prevents the transmitter output from passing into the receiving tube 74. When the receiver detects no more supersonic energy, the relay 107 opens, deenergizing the motor 25 and leaving the cut-off wheel in a slightly advanced position.

As the wheel continues to wear down, the above action is repeated until the sliding plate 29 assumes a position representing the minimum usable diameter of the cut-off wheel. At that position, the limit switch 104 opens and the pilot lamp 103 lights. The motor reversing switch 102 is automatically closed by overcoming the bias spring and the push button switch 105 is closed. This energizes the motor 25 in the reverse direction. When the sliding plate 29 reaches its extreme withdrawn position (maximum distance between the main shaft and the cut-off wheel shaft 84), lamp 111 will light and push button 105 must be released. At this position the worn-out cut-off wheel 26 can be removed and a new wheel 26 installed.

The cut-off wheel-and-pump motor 15 has a double-ended output shaft; one end is connected to a hydraulic pump 13 which circulates the coolant 68 sprayed on the cut-off wheel at the point of grinding; the other end of the shaft is connected to a variable diameter pulley 16. A belt 17 connects the driving pulley 16 to a driven pulley 18 which is mounted on a shaft supported by a bearing 22, which, in turn, is fastened to the sliding plate 29. When the sliding plate 29 is moved so that the centers of the cut-off wheel shaft 84 and main shaft 33 are closer together, the drive belt 17 loosens the two halves of the pulley 16 contact thus increasing the effective diameter of the pulley 16. As the driven pulley 18 is fixed in size, the result is that the driven pulley 18 rotates at a higher angular velocity causing the peripheral velocity of the cut-off wheel 26 to remain substantially the same despite the decrease in diameter of the latter. Thus, it always operates at the optimum speed for best results and longest life.

The pulleys 20 and 19 connected together by the belt 21 are of fixed diameters and selected to provide the speed needed should it be impractical to provide that speed by the pulleys 16 and 18 only. The sliding plate 29 is kept from twisting sideways by means of an integral tenon 96 fitting into a slot 28 of the guide plate 27. A small plate 29, the same length as the tenon 96 but wider, is attached to the tenon 96 so that the sliding plate 29 is free to slide upon the guide plate 27, but is trapped in all other directions.

The main shaft 33 is driven by means of a sprocket 89 which is attached to the reduced diameter end 32 of the main shaft 33 and rotates in a bearing 79. The sprocket 89 is linked by a chain 31 to another sprocket 49 attached to one end of the output shaft 48 of the speed reducer 48, which is driven by the input shaft 46 of the motor 45. A second output shaft 37 from the speed reducer 47 is terminated by a sprocket 44. This sprocket drives a link belt 42 which, in turn, drives sprockets 64 and 62 attached to elastomeric rollers 56 and 55 respectively and an idler sprocket 43 attached to bracket 94.

The shafts bearing the sprockets 62 and 64, are supported by bearings 65 which are attached to an adjustable bracket 63 provided with slots for adjustment and mounting. When the stock 40 is fed into the machine and reaches the revolving plastic roller 56, the stock 40 is urged to move towards the cut-off end of the machine until it butts against the stop arm 52. At this point the rollers continue to revolve but merely slide on the surface of the stock 40 until it has been angularly rotated past the rollers 55 and 56.

The stop arm 52 is rigidly attached to the stop-block 53 which rests on the base 10, and is adjustable longitudinally by means of the stop-adjusting screw 50. It can be locked in position by means of stop-lock screws 51.

Another version of the stock carrier 66 hold-downs is shown in FIGURE 2. The stock supporting ring 57, the assembly screws 58, the leaf-springs 85 and the stock spools 86 are all replaced by a single garter spring 59. An O-ring of elastomeric material and of the proper size would be equally effective.

In order to provide the maximum accuracy of cut, the cut-off wheel 26 is placed between two wheel guides 77 and 78, which are made of hardened steel and mounted in cut-off wheel guide mounts 34 and 35, and 34′ and 35′. The guides are rotatable in their mounts so that as wear occurs, they may be rotated slightly to present a fresh, accurate guide again. To decrease the cut-off wheel 26 wear even farther, it is coated with a thin layer of low friction plastic such as Teflon.

A detailed description of the electrical components and their operation is given below:

Switch 101 is the main switch, normally open, and turned "on" or "off" manually to control the current to the motors 25, 45, 15 and the supersonic unit 114.

Switch 102 is a double-pole double-throw reversing switch, spring-loaded so it normally phases the motor 25 to operate in a "forward" direction, moving the cutting edge of the cut-off wheel 26 nearer the main shaft 33. When the cut-off wheel 26 has been abraded to the minimum usable diameter, switch 102 is automatically flipped to the "reverse" position and held in that position while the jogging switch 105 is held "closed" until the motor 25 has moved the cut-off wheel 26 to the furthermost distance from the main shaft 33 at which time the jogging switch 105 is released and the reversing switch 102 returns to its normal position.

Switch 104 is a normally closed snap switch which opens the circuit to the reversing motor 25 when the sliding plate 29 reaches the extreme limit of travel in one direction.

Switch 106 is a normally closed snap switch which opens the circuit to the reversing motor 25 when the sliding plate 29 reaches the extreme limit of travel in the opposite direction and stops motor 15 as well.

Switches 104 and 106 are "limit" switches and intended to protect the motor 25 from being overloaded and associated moving parts damaged if the motor should remain energized during a travel interference.

The normally open relay 107 is connected so it closes only when the supersonic transmitter and receiver 114 are operating.

Switch 105 is a normally-open push button switch which shunts the supersonic unit relay 107 and limit switches 104 and 106. It is used, primarily in making adjustments to the machine.

Switch 108 turns the supersonic unit 114 "on" or "off". During the operating of the machine, this switch 108 is in the "on" position.

Switch 109 is normally closed and current flows through it to the motors 15 and 45 if switches 112 and 110 are also closed (which is the normal operating condition). Switches 112 and 110 may be operated individually for making adjustments.

In setting up this machine and adjusting it for the first time, the following steps should be observed:

(1) Motor Switch 101 must be in the "open" position.
(2) Reversing switch 102 must be in the normal "forward" position.
(3) Limit switches 104 and 106 must be "open."
(4) Push button switch 105 must be in the normal "open" position.
(5) Supersonic relay 107 must be in "open" position.
(6) Motor switch 109 must be in "open" position.
(7) Supersonic unit switch 108 must be in the "closed" position.

The master switch 101 is closed, energizing the supersonic unit 114. Transmitting and receiving tubes 74 and 73 are adjusted so withdrawal of cut-off wheel 26, interposed between the ends of these tubes, causes the relay 107 to "close" and upon reinsertion of the cut-off wheel 26 between the tube ends 74 and 73 causes the relay 107 to "open." The tubes should be left at the position where the relay 107 just "closes" when the cut-off wheel 26 no longer severs the rod. Pilot lamps 103 and 111 should be burning at low brilliancy. Switch 107 should be adjusted to barely close whereupon lamp 111 will light only. The motor 25 may be adjusted by pressing push-button switch 105 manually. If the motor overshoots past the limit, the reversing switch 102 can be snapped into the "reverse" position and then push-button switch 105 jogged as needed to bring sliding plate 29 to the end of travel.

After the setting for the limit switch 104 has been made, the reversing switch 102 is manually snapped into the "reverse" position and the push-button switch 105 depressed until the sliding plate 29 is almost at the end of travel in the opposite direction. The limit switch 106 should then be adjusted so it just closes whereupon pilot lamps 111 will extinguish.

During normal operation, the limit switches 104 and 106 are closed and pilot lamps 103 and 111 are "out." when sliding plate 29 has moved closest to the main shaft 33, the limit switch 104 opens and the pilot lamp 103 lights. When the sliding plate 29 reaches the opposite extreme of travel, the limit switch 106 opens and the pilot lamp 111 lights.

The present invention, in another of its aspects, relates to novel features of the instrumentalities described herein for teaching the principal object of the invention and to the novel principles employed in the instrumentalities whether or not these features and principles may be used in the said object and/or in the said field.

The concept of the present invention as hereinbefore described in one of its embodiments, is merely illustrative and not exhaustive in scope. Since many widely different embodiments of the invention may be made without departing from the scope thereof, it is intended that all matter contained in the above description and shown in the accompanying drawings shall be interpreted as being illustrative and not of a limiting nature.

Having revealed the features of this invention described above, the following claims are made:

1. In an automatic machine for cutting stock, a main base for mounting thereon other parts comprising said machine, a holding means for supporting said stock concentrically around a main shaft, a rotary means for revolving said holding means, a settable stop determining the length of a work piece cut from said stock, a feeding means consisting of elastomeric rollers to urge stock into a cutting position, a releasing means permitting said stock to slide and butt against said stop, a clamping means for holding said stock firmly, a cut-off wheel rotated by a driving means, and capable of moving transversely with reference to the longitudinal axis of said main shaft, the movement towards said main shaft initiated by the reduction in diameter of said cut-off wheel from erosion sensed by a supersonic signal means directed against the periphery of said cut-off wheel, detected by a supersonic detector energizing a reversing motor circuit causing a reversing motor to move said cut-off wheel closer to said stock by substantially the amount of erosion, a speed changing means connected between said cut-off wheel and said driving means maintaining cut-off wheel peripheral speed substantially constant regardless of said erosion, a coolant circulating means supplying said coolant to said cut-off wheel at the area of abrasion, guide means supporting said cut-off wheel and plastic coating said cut-off wheel on both sides to reduce abrasion of said guide means.

2. In an automatic machine for cutting stock, a holding means for supporting several pieces of said stock concentrically around a main shaft, a means for revolving said holding means, an adjustable stop setting the length of a work piece cut from said stock, a feeding means comprising compliant rollers to urge stock into a cutting position, a releasing means permitting said stock to slide and butt against said stop, a clamping means for holding said stock firmly, a cut-off wheel mounted on a small shaft parallel to said main shaft, said small shaft journalled in at least one bearing and rotated by a driving means, said bearing fastened to a small base capable of moving transversely with reference to the longitudinal axis of said small shaft, the movement towards said main shaft initiated by the reduction in diameter of said cut-off wheel from erosion, said erosion sensed by a supersonic signal means directed against the periphery of said cut-off wheel, and detected by a supersonic detector energizing a reversing motor circuit causing a reversing motor to move said cut-off wheel closer to said stock by substantially the amount of erosion, a speed changing means connected between said cut-off wheel and said driving means maintaining cut-off wheel peripheral speed substantially constant regardless of said erosion, a coolant circulating means supplying said coolant to said cut-off wheel at the area of abrasion, guide means supporting said cut-off wheel and plastic coating said cut-off wheel on both sides to reduce abrasion of said guide means.

3. In an automatic machine for cutting stock, a main base for mounting thereon other parts comprising said machine, a holding means for supporting said stock concentrically around a main shaft, a rotary means for revolving said holding means, an adjustable stop with a locking device setting the length of a work piece cut from said stock, a feeding means to urge stock into a cutting position, a releasing means comprising a cam and stockholders permitting said stock to slide and butt against said stop, a clamping means for holding said stock firmly, a cut-off wheel mounted on a small shaft parallel to said main shaft, said small shaft journalled in at least one bearing and rotated by an electric motor, said bearing fastened to a small base capable of moving transversely with reference to the longitudinal axis of said small shaft, the movement towards said main shaft initiated by the reduction in diameter of said cut-off wheel from erosion, said erosion sensed by a supersonic signal means directed against the periphery of said cut-off wheel, and detected by a supersonic detector energizing a reversing motor circuit causing a reversing motor to move said cut-off wheel closer to said stock by substantially the amount of erosion, a variable pitch pulley mounted on said shaft bearing, said cut-off wheel and belted to said driving means thus maintaining cut-off wheel peripheral speed substantially constant regardless of said erosion, a coolant circulating means supplying said coolant to said cut-off wheel at the area of abrasion, guide means supporting said cut-off wheel and plastic coating said cut-off wheel on both sides to reduce abrasion of said guide means.

4. In an automatic machine for cutting stock, a holding means for supporting multiple pieces of said stock concentrically around a main shaft, an electric motor and speed reducer for revolving said holding means, a locking adjustable stop setting the length of a workpiece cut from said stock at least one feeding means for urging stock into a cutting position, a releasing means permitting said stock to slide and butt against said stop, a clamping means for holding said stock firmly for cutting, a cut-off wheel mounted on a small shaft parallel to said main shaft, said small shaft journalled in at least one bearing and rotated by a driving means, said bearing fastened to a small base capable of moving transversely with reference to the longitudinal axis of said small shaft, the movement towards said main shaft initiated by the reduction in diameter of said cut-off wheel from wear, said wear sensed by a superaudible signal means directed against the periphery of said cut-off wheel, and detected by a supersonic detector energizing a reversing motor circuit causing a reversing motor to move said cut-off wheel closer to the stock by substantially the amount of erosion, a speed changing means connected between said cut-off wheel and said driving means maintaining cut-off wheel peripheral speed substantially constant regardless of said erosion, a coolant circulating pump supplying said coolant to said cut-off wheel at the area of abrasion, guide means supporting said cut-off wheel and plastic coating said cut-off wheel on both sides to reduce abrasion of said guide means.

5. In an automatic machine for cutting stock, a holding means for supporting multiple pieces of said stock concentrically around a main shaft, an electric motor and speed reducer for revolving said holding means, a locking adjustable stop setting the length of a work piece cut from said stock at least one feeding means for urging stock into a cutting position, a releasing means permitting said stock to slide and butt against said stop, a clamping means for holding said stock firmly for cutting, a cut-off wheel mounted on a small shaft parallel to said main shaft, said small shaft journalled in at least one bearing and rotated by a driving means, said bearing fastened to a small base capable of moving transversely with reference to the longitudinal axis of said small shaft, the movement towards said main shaft initiated by the reduction in diameter of said cut-off wheel from wear, said wear sensed by a superaudible signal means directed against the periphery of said cut-off wheel, and detected by a supersonic detector energizing a reversing motor circuit causing a reversing motor to move said cut-off wheel closer to the stock by substantially the amount of erosion, a speed changing means connected between said cut-off wheel and said driving means maintaining cut-off wheel peripheral speed substantially constant regardless of said erosion, guide means supporting said cut-off wheel and plastic coating said cut-off wheel on both sides to reduce abrasion of said guide means.

6. In an automatic machine for cutting stock pieces into predetermined lengths, cylindrical holding means including a plurality of slots for carrying a stock piece in each of said slots, rotary means rotating said holding means, stop means determining the length of a work piece cut from each of said stock pieces, feeding means including rollers uring several of said stock pieces toward said stop means, releasing means permitting said several of said stock pieces to advance in said respective slots and butt against said stop means thereby assuming cutting positions, clamping means fixedly retaining said advanced stock pieces in said cutting positions as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, signal emitting means directed against the periphery of said cut-off wheel means for detecting erosion of said cut-off wheel means, signal detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, and guide means supporting said cut-off wheel means.

7. In an automatic machine for cutting stock pieces into predetermined lengths, cylindrical holding means including a plurality of slots for carrying a stock piece in each of said slots, rotary means rotating said holding means, stop means determining the length of a work piece cut from each of said stock pieces, feeding means including rollers urging several of said stock pieces toward stop means, releasing means permitting said several of said stock pieces to advance in said respective slots and butt against said stop means thereby assuming cutting positions, clamping means fixedly retaining said advanced stock pieces in said cutting positions as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, signal emitting means directed against the periphery of said cut-off wheel means for detecting erosion of said cut-off wheel means, signal detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, and a plastic coating on the sides of said cut-off wheel means reducing abrasion of said guide means.

8. In an automatic machine for cutting stock pieces into predetermined lengths, cylindrical holding means including a plurality of longitudinal slots substantially equally spaced about the periphery of said holding means for carrying a stock piece in each of said slots, rotary means rotating said holding means, stop means determining the length of a work piece cut from each of said stock pieces, feeding means including elastomeric rollers urging several of said stock pieces toward said stop means, releasing means permitting said several of said stock pieces to advance in said respective longitudinal slots and butt against said stop means thereby assuming cutting positions, clamping means fixedly retaining said advanced stock pieces in said cutting positions as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, signal emitting means directed against the periphery of said cut-off wheel means for detecting erosion of said cut-off wheel means, signal detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, and a plastic coating on the sides of said cut-off wheel means reducing abrasion of said guide means.

9. In an automatic machine for cutting stock pieces into predetermined lengths, cylindrical holding means including a plurality of longitudinal slots substantially equally spaced about the periphery of said holding means for carrying a stock piece in each of said slots, rotary means rotating said holding means, stop means determining the length of a work piece cut from each of said stock pieces, feeding means including elastomeric rollers urging several of said stock pieces toward said stop means, releasing means permitting said several of said stock pieces to advance in said respective longitudinal slots and butt against said stop means thereby assuming cutting positions, clamping means fixedly retaining said advanced stock pieces in said cutting positions as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, supersonic signal emitting means directed against the periphery of said cut-off wheel means for detecting erosion of said cut-off wheel means, supersonic detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, and a plastic coating on the sides of said cut-off wheel means reducing abrasion of said guide means.

10. In an automatic machine for cutting stock pieces into predetermined lengths, cylindrical holding means including a plurality of longitudinal slots substantially equally spaced about the periphery of said holding means for carrying a stock piece in each of said slots, rotary means rotating said holding means, adjustable stop means including a locking means determining the length of a workpiece cut from each of said stockpieces, feeding means including compliant rollers urging several of said stock pieces toward said stop means, releasing means permitting said several of said stock pieces to advance in said respective longitudinal slots and butt against said stop means thereby assuming cutting positions, clamping means fixedly retaining said advanced stock pieces in said cutting positions as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, supersonic signal emitting means directed against the periphery of said cut-off wheel means for detecting erosion of said cut-off wheel means, supersonic detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, and a plastic coating on the sides of said cut-off wheel means reducing abrasion of said guide means.

11. In an automatic machine for cutting stock pieces into predetermined lengths, cylindrical holding means including a plurality of longitudinal slots substantially equally spaced about the periphery of said holding means for carrying a stock piece in each of said slots, rotary means rotating said holding means, adjustable stop means including a locking means determining the length of a work piece cut from each of said stock pieces, feeding means including elastomeric rollers urging several of said stock pieces toward said stop means, releasing means including a cam means, clamping means normally engaged with said stock pieces, said clamping means engaging with said cam means as said holding means is rotated permitting said several of said stock pieces to advance in said respective longitudinal slots and butt against said stop means thereby assuming cutting positions, said clamping means fixedly retaining said advanced stock pieces in said cutting positions after disengaging with said cam means as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, supersonic signal means directed against the periphery of said cut-off wheel means for detecting erosion of said cut-off wheel means, supersonic detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, and a plastic coating on the sides of said cut-off wheel means reducing abrasion of said guide means.

12. In an automatic machine for cutting stock pieces into predetermined lengths, cylindrical holding means including a plurality of longitudinal slots substantially equally spaced about the periphery of said holding means for carrying a stock piece in each of said slots, rotary means rotating said holding means, adjustable stop means including a locking means determining the length of a work piece cut from each of said stock pieces, feeding means including elastomeric rollers urging several of said stock pieces toward said stop means, releasing means including cam means having rise and fall contours, clamping means including roller means normally engaged with said stock pieces, said roller means engaging said rise contour of said cam means and riding up said rise contour of said cam means displacing said clamping means from engagement with said several stock pieces, permitting said several of said stock pieces to advance in said respective longitudinal slots and butt against said stop means thereby assuming cutting positions, said clamping means fixedly retaining said advanced stock pieces in said cutting positions after said roller rides down said fall contour allowing said clamping means to engage with said advanced stock pieces as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, supersonic signal means directed against the periphery of said cut-off wheel means for detecting erosion of said cut-off wheel means, supersonic detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, and a plastic coating on the sides of said cut-off wheel means reducing abrasion of said guide means.

13. In an automatic machine for cutting stock pieces into predetermined lengths, cylindrical holding means including a plurality of longitudinal slots substantially equally spaced about the periphery of said holding means for carrying a stock piece in each of said slots, rotary means rotating said holding means, adjustable stop means including a locking means determing the length of a work piece cut from each of said stock pieces, feeding means including elastomeric rollers urging several of said stock pieces toward said stop means, releasing means including cam means having rise and fall contours, clamping means including roller means normally engaged with said stock pieces, said roller means engaging said rise contour of said cam means and riding up said rise contour of said cam means displacing said clamping means from engagement with said several stock pieces, permitting several of said stock pieces to advance in said respective longitudinal slots and butt against said stop means thereby assuming cutting positions, said clamping means fixedly retaining said advanced stock pieces in said cutting positions after said roller rides down said fall contour allowing said clamping means to engage with said advanced stock pieces as said holding means is rotated by said rotary means, cut-off wheel means cutting said predetermined length work piece from each of said stock pieces as said rotating holding means displaces each of said stock pieces into said cut-off wheel means, continued rotation of said holding means by said rotary means causing said stock pieces to again engage with said feeding means thereby again advancing said stock pieces to again abut with said stop means, said cut-off wheel means rotated by a driving means and transversely movable with respect to the longitudinal axis of said holding means, supersonic signal means directed against the periphery of said cut-off wheel means for detecting erosion of said cut-off wheel means, supersonic detector means sensing erosion of said cut-off wheel means energizing a reversing motor circuit means causing a reversing motor means to displace said cut-off wheel means toward the longitudinal axis of said holding means and closer to said stock pieces by substantially the amount of erosion thereby assuring a cleanly cut work piece from each of said stock pieces, speed changing means connected between said cut-off wheel means and said driving means maintaining the peripheral speed of said cut-off wheel means substantially constant regardless of the amount of erosion of said cut-off wheel means, guide means supporting said cut-off wheel means, a plastic coating on the sides of said cut-off wheel means reducing abrasion of said guide means, and coolant circulating means supplying coolant to said cut-off wheel means at the area of abrasion.

(References on following page)

References Cited

UNITED STATES PATENTS

| | | | |
|---|---|---|---|
| 2,163,967 | 6/1939 | Strawn et al. | 83—292 |
| 2,236,150 | 3/1941 | Maltby | 83—411 |
| 2,405,367 | 8/1946 | Nichols | 144—3 |
| 2,445,167 | 7/1948 | Dahl et al. | 51—98 |
| 2,795,090 | 6/1957 | Sterna | 51—215 |
| 2,810,438 | 10/1957 | Stone | 83—411 |
| 2,994,994 | 8/1961 | Lonaberger | 51—134.5 |
| 3,082,580 | 3/1963 | Lonaberger | 51—134.5 |
| 3,115,401 | 12/1963 | Downing et al. | 51—206 X |
| 3,174,257 | 3/1965 | Maki | 51—99 |

LESTER M. SWINGLE, *Primary Examiner.*